United States Patent
Lee et al.

(10) Patent No.: US 10,011,672 B2
(45) Date of Patent: *Jul. 3, 2018

(54) PHOTOSENSITIVE RESIN COMPOSITION FOR COLOR FILTER AND COLOR FILTER USING THE SAME

(71) Applicant: Samsung SDI Co., Ltd., Yongin-si (KR)

(72) Inventors: In-Jae Lee, Uiwang-si (KR);
Dong-Wan Kim, Uiwang-si (KR);
Ji-Hong Kim, Uiwang-si (KR);
Jee-Hyun Ryu, Uiwang-si (KR);
Ji-Young Jeong, Uiwang-si (KR);
Seung-Jib Choi, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 675 days.

This patent is subject to a terminal disclaimer.

(21) Appl. No.: 14/101,389

(22) Filed: Dec. 10, 2013

(65) Prior Publication Data

US 2014/0343187 A1 Nov. 20, 2014

(30) Foreign Application Priority Data

May 16, 2013 (KR) .................. 10-2013-0055937
Dec. 9, 2013 (KR) .................. 10-2013-0152486

(51) Int. Cl.
| | |
|---|---|
| *C08F 222/10* | (2006.01) |
| *C08F 220/00* | (2006.01) |
| *C09D 4/06* | (2006.01) |
| *C09D 133/08* | (2006.01) |

(52) U.S. Cl.
CPC ...... *C08F 222/1006* (2013.01); *C08F 220/00* (2013.01); *C09D 4/06* (2013.01); *C09D 133/08* (2013.01)

(58) Field of Classification Search
CPC .. C08L 33/10; C08L 33/08; C08F 2/50; C08F 222/1006; C08F 220/00; C09D 4/06; C09D 133/08
See application file for complete search history.

(56) References Cited

U.S. PATENT DOCUMENTS

| | | | |
|---|---|---|---|
| 5,114,817 A | 5/1992 | Urano et al. | |
| 5,346,545 A | 9/1994 | Chassot | |
| 5,998,091 A | 12/1999 | Suzuki | |
| 6,033,813 A | 3/2000 | Endo et al. | |
| 6,649,335 B2 | 11/2003 | Missfeldt | |
| 6,733,935 B2 | 5/2004 | Kishimoto et al. | |
| 7,018,751 B2 | 3/2006 | Andrews et al. | |
| 7,517,619 B2* | 4/2009 | Hosaka ................. | G03F 7/0007 257/440 |
| 8,828,630 B2 | 9/2014 | Kwon et al. | |
| 2002/0051926 A1 | 5/2002 | Takashima et al. | |
| 2005/0227178 A1 | 10/2005 | Morita et al. | |
| 2007/0026410 A1 | 2/2007 | Yu et al. | |
| 2007/0238802 A1 | 10/2007 | Harada et al. | |
| 2008/0048155 A1* | 2/2008 | Toriniwa ............... | C07D 209/14 252/587 |
| 2008/0053953 A1* | 3/2008 | Yoshibayashi .... | G02F 1/133516 216/24 |
| 2008/0237553 A1 | 10/2008 | Miya et al. | |
| 2009/0263612 A1 | 10/2009 | Gascoyne et al. | |
| 2010/0104985 A1 | 4/2010 | Watanabe | |
| 2011/0049444 A1 | 3/2011 | Sako et al. | |
| 2011/0224334 A1* | 9/2011 | Maeda ................. | C07D 209/14 524/89 |
| 2013/0122422 A1 | 5/2013 | Kwon et al. | |

FOREIGN PATENT DOCUMENTS

| | | |
|---|---|---|
| CN | 1372166 A | 10/2002 |
| CN | 1969205 A | 5/2007 |
| CN | 101276146 A | 10/2008 |

(Continued)

OTHER PUBLICATIONS

Search Report in commonly owned Chinese Application No. 201210249993.7 dated Feb. 25, 2014, pp. 1-2.
English-translation of Search Report in commonly owned Chinese Application No. 201210249993.7 dated Feb. 25, 2014, pp. 1-2.
Search Report in commonly owned Taiwanese Application No. 101130126 dated Feb. 20, 2014, pp. 1.
English-translation of Search Report in commonly owned Taiwanese Application No. 101130126 dated Feb. 20, 2014, pp. 1.
Search Report in commonly owned Taiwanese Application No. 102125908 dated Oct. 16, 2014, pp. 1-2.
Ajay K. P. et al., "Photo-Rechargeable Battery Effect in First Generation Cationic-Cyanine Dendrimers", Adv. Mater., 2010, vol. 22, pp. 3954-3958.

(Continued)

*Primary Examiner* — Michael F Pepitone
*Assistant Examiner* — Jessica M Roswell
(74) *Attorney, Agent, or Firm* — Additon, Higgins & Pendleton, P.A.

(57) ABSTRACT

A photosensitive resin composition for a color filter includes (A) a yellow or orange dye; (B) a dye combination of a cyanine dye represented by the following Chemical Formula 1, wherein in Chemical Formula 1, each substituent is the same as described in the detailed description, and a metal complex dye; (C) an acrylic-based binder resin; (D) a photopolymerizable monomer; (E) a photopolymerization initiator; and (F) a solvent, and a color filter using the same.

[Chemical Formula 1]

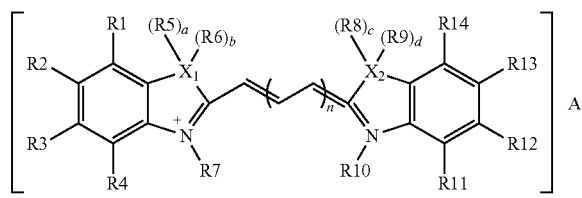

19 Claims, No Drawings

(56) References Cited

FOREIGN PATENT DOCUMENTS

| | | |
|---|---|---|
| CN | 100501462 C | 6/2009 |
| CN | 101675117 A | 3/2010 |
| CN | 102224204 A | 10/2011 |
| CN | 102604429 A | 7/2012 |
| CN | 103105731 A | 5/2013 |
| JP | 04-059874 A | 2/1992 |
| JP | 05-059291 A | 3/1993 |
| JP | 5059291 | 3/1993 |
| JP | 06-041458 A | 2/1994 |
| JP | 06-199045 A | 7/1994 |
| JP | 07-140654 A | 6/1995 |
| JP | 2589376 A | 3/1997 |
| JP | 09-230531 A | 9/1997 |
| JP | 10-086517 A | 4/1998 |
| JP | 10-254133 A | 9/1998 |
| JP | 11-015100 A | 1/1999 |
| JP | 2000-019673 A | 1/2000 |
| JP | 2000-356833 A | 12/2000 |
| JP | 2002-040593 A | 2/2002 |
| JP | 2002-062642 A | 2/2002 |
| JP | 2002-072463 A | 3/2002 |
| JP | 2002-072464 A | 3/2002 |
| JP | 2003-280131 | 10/2003 |
| JP | 2005-099416 A | 4/2005 |
| JP | 2005-297406 A | 10/2005 |
| JP | 2009-203186 | 9/2009 |
| JP | 2011-186367 A | 9/2011 |
| KR | 10-1991-0004717 B1 | 7/1991 |
| KR | 10-1994-0007778 | 8/1994 |
| KR | 1999-0007097 A | 1/1999 |
| KR | 2002-0015650 A | 2/2002 |
| KR | 2005-0020653 A | 3/2005 |
| KR | 10-2007-0041718 | 4/2007 |
| KR | 10-2008-0088518 A | 10/2008 |
| KR | 10-2009-0096328 | 9/2009 |
| KR | 2009-0106226 A | 10/2009 |
| KR | 10-2009-0126192 A | 12/2009 |
| KR | 2010-0078845 A | 7/2010 |
| KR | 2010-0080142 A | 7/2010 |
| KR | 10-0978185 | 8/2010 |
| KR | 10-2012-0105574 | 9/2012 |
| TW | 200942583 A | 10/2009 |
| WO | 89/01186 | 2/1989 |

OTHER PUBLICATIONS

Klotz et al., "Homo- and Hetero-[3] Rotaxanes with Two π-Systems Clasped in a Single Macrocycle", J. Am. Chem. Soc., 2006, vol. 128, pp. 15374-15375.

Office Action in commonly owned U.S. Appl. No. 13/942,825 dated Aug. 28, 2015, pp. 1-8.

Search Report in counterpart Chinese Application No. 201310660941.3 dated May 11, 2017, pp. 1-2.

Search Report in commonly owned Chinese Application No. 201310298057.X dated May 24, 2016, pp. 1-2.

Notice of Allowance in commonly owned U.S. Appl. No. 13/942,825 dated Mar. 14, 2016, pp. 1-7.

Office Action in commonly owned U.S. Appl. No. 13/942,825 dated Dec. 14, 2016, pp. 1-7.

* cited by examiner

PHOTOSENSITIVE RESIN COMPOSITION FOR COLOR FILTER AND COLOR FILTER USING THE SAME

CROSS-REFERENCE TO RELATED APPLICATION

This application claims priority to and the benefit of Korean Patent Application No. 10-2013-0055937 filed in the Korean Intellectual Property Office on May 16, 2013, and Korean Patent Application No. 10-2013-152486 filed in the Korean Intellectual Property Office on Dec. 9, 2013, the entire disclosure of each of which is incorporated herein by reference.

FIELD OF THE INVENTION

This disclosure relates to a photosensitive resin composition for a color filter and a color filter using the same.

BACKGROUND OF THE INVENTION

Liquid crystal displays (LCDs) among the different kinds of displays have advantages such as lightness, thinness, low cost, low power consumption for operation, and improved adherence to an integrated circuit. LCDs are increasingly used for laptop computers, monitors, and TV screens.

This liquid crystal display is equipped with a color filter formed by repeating a unit pixel, in which three primary color sub-pixels of red (R), green (G), and blue (B) are combined. The unit pixel displays a particular color due to a combination of three primary colors when each sub-pixel is adjacently disposed and a color signal is applied and brightness controlled.

The color filter is made of red (R), green (G), and blue (B) color dyes or pigments. These color materials play a role of changing a white light from a backlight unit into each corresponding color light.

When the color materials have a spectrum with no unnecessary wavelength other than a required absorption wavelength and a smaller absorption band, display performance of the color filter may be improved. In addition, the color materials are required to have excellent heat resistance, light resistance, and chemical resistance without being faded or discolored when exposed to ultraviolet (UV) radiation, acid, and base during etching of a color resist.

In order to increase color purity of a large screen liquid crystal display (LCD), a color filter can be fabricated using a photosensitive resin composition prepared by increasing the concentration of a colorant. Accordingly, a photosensitive resin composition is required to have lowered development speed to increase productivity and yield in the manufacturing process and to have excellent sensitivity despite little exposure to light.

In general, a color filter may be manufactured by coating three or more colors on a transparent substrate using methods such as dyeing, electrophoretic deposition (EPD), printing, pigment dispersion, and the like. Recently the pigment dispersion using a pigment dispersive color resist has been more actively adopted. The pigment dispersion method forms a colored film by repeating a series of processes such as coating, exposing to light, developing, and curing a photopolymer composition including a coloring agent on a transparent substrate including a black matrix. This method may improve heat resistance and durability, which are very important characteristics for a color filter, and may provide a uniform film thickness.

However, while the pigment dispersion method can have these advantages, it generally cannot accomplish certain levels of color characteristics such as luminance, contrast ratio, and the like.

Accordingly, there is a need for a method that can compensate for a deteriorated contrast ratio due to particle properties of a dispersed pigment and additionally can secure high luminance.

SUMMARY OF THE INVENTION

One embodiment of the present invention provides a photosensitive resin composition for a color filter that can have high absorbance, luminance, and contrast ratio and excellent heat resistance and chemical resistance.

Another embodiment of the present invention provides a color filter manufactured using the photosensitive resin composition for a color filter.

One embodiment of the present invention provides a photosensitive resin composition for a color filter that includes (A) include only one of a yellow dye or an orange dye; (B) a dye combination of a cyanine dye represented by the following Chemical Formula 1 and a metal complex dye; (C) an acrylic-based binder resin; (D) a photopolymerizable monomer; (E) a photopolymerization initiator; and (F) a solvent:

[Chemical Formula 1]

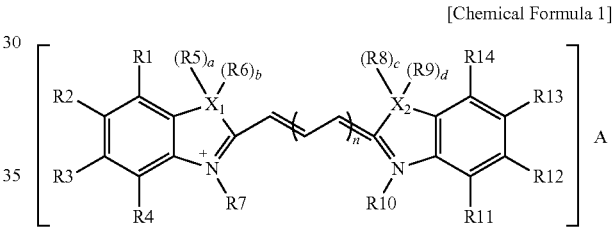

In the above Chemical Formula 1, $X_1$ and $X_2$ are the same or different and are each independently carbon, nitrogen, oxygen or sulfur, R1 to R4 and R11 to R14 are the same or different and are each independently hydrogen, halogen, substituted or unsubstituted C1 to C20 alkyl, substituted or unsubstituted C1 to C20 haloalkyl, substituted or unsubstituted C1 to C20 alkoxy, substituted or unsubstituted C2 to C20 alkenyl, substituted or unsubstituted C2 to C20 alkynyl, substituted or unsubstituted C3 to C20 cycloalkyl, substituted or unsubstituted C3 to C20 cycloalkenyl, substituted or unsubstituted C3 to C20 cycloalkynyl, substituted or unsubstituted C2 to C20 heterocycloalkyl, substituted or unsubstituted C2 to C20 heterocycloalkenyl, substituted or unsubstituted C2 to C20 heterocycloalkynyl, substituted or unsubstituted C6 to C30 aryl, substituted or unsubstituted C2 to C30 heteroaryl, or substituted or unsubstituted C1 to C20 alkyl(meth)acrylate, R5, R6, R8 and R9 are the same or different and are each independently hydrogen or substituted or unsubstituted C1 to C20 alkyl, R7 and R10 are the same or different and are each independently hydrogen, substituted or unsubstituted C1 to C20 alkyl, substituted or unsubstituted C1 to C20 alkyl (meth)acrylate, or substituted or unsubstituted C6 to C30 aryl, n is an integer ranging from 1 to 4, a, b, c and d are the same or different and are each independently an integer of 0 or 1, and A is a halogen ion, $ClO_4^-$, $BF_4^-$, $SbF_6^-$, $CF_3SO_3^-$, $N(SO_2CF_3)_2^-$ or one of compounds represented by the following Chemical Formulae 2-1 and 2-2:

[Chemical Formula 2-1]

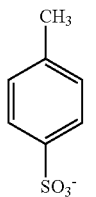

[Chemical Formula 2-2]

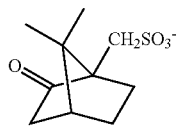

The yellow or orange dye in the photosensitive resin composition for a color filter may have a transmittance of about 0% to about 40% in an about 380 nm to about 500 nm wavelength region, and a transmittance of about 50% to about 100% in an about 570 nm to about 590 nm wavelength region.

The yellow or orange dye may include a direct dye, acidic dye, basic dye, acidic mordant dye, sulfur dye, reduction dye, azoic dye, disperse dye, reactivity dye, oxidation dye, alcohol soluble dye, azo dye, anthraquinone dye, indigoid dye, carbonium ion dye, phthalocyanine dye, nitro dye, quinoline dye, cyanine dye, methine dye, or a combination thereof.

The yellow or orange dye may include solvent yellow 19, solvent yellow 21, solvent yellow 25, solvent yellow 79, solvent yellow 82, solvent yellow 88, solvent orange 45, solvent orange 54, solvent orange 62, solvent orange 99, or a combination thereof.

The R5, R6, R8, and R9 of the cyanine dye represented by the above Chemical Formula 1 may be each independently hydrogen or substituted or unsubstituted C1 to C20 alkyl.

The R7 and R10 of the cyanine dye represented by the above Chemical Formula 1 may be each independently hydrogen, substituted or unsubstituted C1 to C20 alkyl, substituted or unsubstituted C1 to C20 alkyl(meth)acrylate, or substituted or unsubstituted C6 to C30 aryl.

The A of the cyanine dye represented by the above Chemical Formula 1 may be $CF_3SO_3^-$ or $N(SO_2CF_3)_2^-$.

The cyanine compound represented by the above Chemical Formula 1 may re-emit light in a wavelength of about 400 nm to about 700 nm.

The cyanine dye may be a yellow, orange, or red dye.

The metal complex dye may have a maximum absorption peak in the wavelength of about 200 nm to about 650 nm.

The metal complex dye may include at least one metal ion selected from Mg, Ni, Cu, Co, Zn, Cr, Pt, Pd, and/or Fe.

The metal complex dye may include a composite of a metal ion and at least one dye selected from solvent yellow 19, solvent yellow 21, solvent yellow 25, solvent yellow 79, solvent yellow 82, solvent yellow 88, solvent orange 45, solvent orange 54, solvent orange 62, solvent orange 99, solvent red 8, solvent red 32, solvent red 109, solvent red 112, solvent red 119, solvent red 124, solvent red 160, solvent red 132, and/or solvent red 218.

The photosensitive resin composition for a color filter may further include a pigment.

The pigment may include a red pigment, a yellow pigment, an orange pigment, or a combination thereof.

The red pigment may include C.I. pigment red 242, C.I. pigment red 214, C.I. pigment red 221, C.I. pigment red 166, C.I. pigment red 220, C.I. pigment red 248, C.I. pigment red 262, C.I. pigment red 254, C.I. pigment red 177, C.I. pigment red 270, C.I. pigment red 272, or a combination thereof.

The yellow pigment may include C.I. yellow pigment 139, C.I. yellow pigment 138, C.I. yellow pigment 150, or a combination thereof.

The photosensitive resin composition may include the cyanine dye and the pigment at a weight ratio of about 1:9 to about 9:1.

The photosensitive resin composition may include about 0.1 wt % to about 5 wt % of the yellow or orange dye (A); about 1 wt % to about 80 wt % of the dye including the cyanine dye and metal complex (B); about 0.1 wt % to about 30 wt % of the acrylic-based binder resin (C); about 0.1 wt % to about 30 wt % of the photopolymerizable monomer (D), about 0.1 wt % to about 5 wt % of the photopolymerization initiator (E); and a balance amount of the solvent (F).

Another embodiment of the present invention provides a color filter manufactured using the photosensitive resin composition for a color filter.

Other embodiments of the present invention are included in the following detailed description.

The photosensitive resin composition for a color filter can have high luminance and contrast ratio, and thus can provide a color filter having excellent heat resistance and chemical resistance. Such a photosensitive resin composition for a color filter may realize high luminance while maintaining an appropriate contrast ratio, particularly in a device having a low transmittance in a short wavelength such as an LED light source.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "substituted" may refer to one substituted with a halogen atom (F, Cl, Br, I), a hydroxy group, a C1 to C20 alkoxy group, a nitro group, a cyano group, an amine group, an imino group, an azido group, an amidino group, a hydrazino group, a hydrazono group, a carbonyl group, a carbamyl group, a thiol group, ester group, an ether group, a carboxyl group or a salt thereof, a sulfonic acid group or a salt thereof, a phosphoric acid or a salt thereof, C1 to C20 alkyl, C2 to C20 alkenyl, C2 to C20 alkynyl, C6 to C30 aryl, C3 to C20 cycloalkyl, C3 to C20 cycloalkenyl, C3 to C20 cycloalkynyl, C2 to C20 heterocycloalkyl, C2 to C20 heterocycloalkenyl, C2 to C20 heterocycloalkynyl, or a combination thereof, in place of at least one hydrogen of a compound.

As used herein, when a specific definition is not otherwise provided, the terms "heterocycloalkyl", "heterocycloalkenyl", "heterocycloalkynyl" and "heterocycloalkylene" refer to cycloalkyl, cycloalkenyl, cycloalkynyl and cycloalkylene cyclic compounds, respectively, including at least one heteroatom including N, O, S, P, or a combination thereof.

As used herein, when a specific definition is not otherwise provided, "(meth)acrylate" refers to both "acrylate" and "methacrylate".

A photosensitive resin composition for a color filter according to one embodiment includes (A) a yellow or orange dye; (B) a dye combination of a cyanine dye represented by the following Chemical Formula 1 and a metal complex dye; (C) an acrylic-based binder resin; (D) a photopolymerizable monomer; (E) a photopolymerization initiator; and (F) a solvent.

Hereinafter, each component is described in detail.

(A) Yellow or Orange Dye

The yellow or orange dye in the photosensitive resin composition for a color filter may have a transmittance of about 0% to about 40% in an about 380 nm to about 500 nm wavelength region, and a transmittance of about 50% to about 100% in an about 570 nm to about 590 nm wavelength region. In exemplary embodiments, the yellow or orange dye may have a transmittance of about 90% to about 100% in an about 570 nm to about 590 nm wavelength region.

In exemplary embodiments, the yellow or orange dye may have a transmittance of about 0% to about 1% in an about 380 nm to about 450 nm wavelength region, and 1% to about 100% in an about 450 nm to about 550 nm wavelength region.

Examples of the yellow and/or orange dye may include without limitation direct dyes, acidic dyes, basic dyes, acidic mordant dyes, sulfur dyes, reduction dyes, azoic dyes, disperse dyes, reactivity dyes, oxidation dyes, alcohol soluble dyes, azo dyes, anthraquinone dyes, indigoid dyes, carbonium ion dyes, phthalocyanine dyes, nitro dyes, quinoline dyes, cyanine dyes, methine dyes, and the like, and combinations thereof.

Examples of the yellow and/or orange dye may include without limitation solvent yellow 19, solvent yellow 21, solvent yellow 25, solvent yellow 79, solvent yellow 82, solvent yellow 88, solvent orange 45, solvent orange 54, solvent orange 62, solvent orange 99, and the like, and combinations thereof.

The photosensitive resin composition may include the yellow and/or orange dye in an amount of about 0.1 wt % to about 5 wt %, based on the total amount (total weight) of the photosensitive resin composition. In some embodiments, the photosensitive resin composition may include the yellow and/or orange dye in an amount of about 0.1, 0.2, 0.3, 0.4, 0.5, 0.6, 0.7, 0.8, 0.9, 1, 2, 3, 4, or 5 wt %. Further, according to some embodiments of the present invention, the amount of the yellow and/or orange dye can be in a range from about any of the foregoing amounts to about any other of the foregoing amounts.

When the yellow and/or orange dye is included in an amount within the above range, high luminance may be obtained in an LCD including an LED backlight while maintaining an appropriate contrast ratio.

(B) Dye Combination Including Cyanine Dye and Metal Complex Dye (B-1) Cyanine Dye The cyanine dye may include a compound represented by the following Chemical Formula 1.

[Chemical Formula 1]

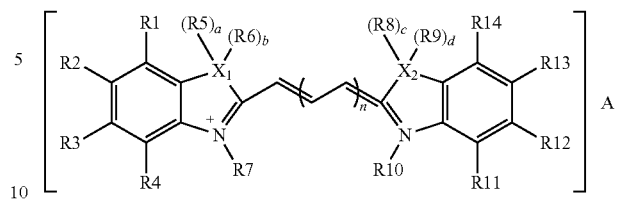

In the above Chemical Formula 1, $X_1$ and $X_2$ are the same or different and are each independently carbon, nitrogen, oxygen or sulfur, In the above Chemical Formula 1, R1 to R4 and R11 to R14 are the same or different and are each independently hydrogen, halogen, substituted or unsubstituted C1 to C20 alkyl, substituted or unsubstituted C1 to C20 haloalkyl, substituted or unsubstituted C1 to C20 alkoxy, substituted or unsubstituted C2 to C20 alkenyl, substituted or unsubstituted C2 to C20 alkynyl, substituted or unsubstituted C3 to C20 cycloalkyl, substituted or unsubstituted C3 to C20 cycloalkenyl, substituted or unsubstituted C3 to C20 cycloalkynyl, substituted or unsubstituted C2 to C20 heterocycloalkyl, substituted or unsubstituted C2 to C20 heterocycloalkenyl, substituted or unsubstituted C2 to C20 heterocycloalkynyl, substituted or unsubstituted C6 to C30 aryl, or substituted or unsubstituted C2 to C30 heteroaryl.

In exemplary embodiments, in the above Chemical Formula 1, R5, R6, R8 and R9 may be each independently hydrogen or substituted or unsubstituted C1 to C20 alkyl, for example, each independently can be substituted or unsubstituted C1 to C20 alkyl.

In the above Chemical Formula 1, R7 and R10 may each independently be hydrogen, substituted or unsubstituted C1 to C20 alkyl, substituted or unsubstituted C1 to C20 alkyl (meth)acrylate, or substituted or unsubstituted C6 to C30 aryl, for example, may each independently be substituted or unsubstituted C1 to C20 alkyl.

In the above Chemical Formula 1, n may be an integer of 1 to 4.

In the above Chemical Formula 1, a, b, c, and d are independently integers of 0 or 1.

In the above Chemical Formula 1, A may be a halogen ion, $ClO_4^-$, $BF_4^-$, $SbF_6^-$, $CF_3SO_3^-$, $N(SO_2CF_3)_2^-$ or one of compounds represented by the following Chemical Formulae 2-1 and 2-2, for example, $CF_3SO_3^-$ or $N(SO_2CF_3)_2^-$.

[Chemical Formula 2-1]

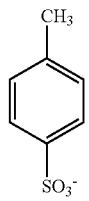

[Chemical Formula 2-2]

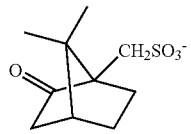

The cyanine dye is a molecule that is dyed itself and absorbs light of a visible region of spectrum, just like a typical dye. However, differently from a typical dye, the methine-based compound is a molecule that re-emits fluorescent light of visible spectrum in a wavelength greater than the wavelength of absorbed light. The wavelength of the re-emitted light of the cyanine dye may range from about 400 to about 700 nm.

The cyanine dye may be a yellow, orange, or red dye. In an exemplary embodiment, the cyanine dye may be a red dye.

When the cyanine dye is used, a color filter having high luminance may be realized due to high transmittance, and a composition for a color filter having excellent heat resistance and chemical resistance may be provided by increasing a curing degree by thermal cross-linking due to a cross-linking terminal end introduced into a structure of the cyanine dye.

(B-2) Metal Complex Dye

The metal complex dye may be a compound having a maximum absorption peak in an about 200 nm to about 650 nm wavelength region, and may be any metal complex dye having all colors soluble in an organic solvent if it has an absorption wavelength within the range in order to adjust a color coordinate by a combination of a dye.

Examples of the metal complex dye may include without limitation yellow dyes having a maximum absorption peak in an about 200 nm to about 400 nm wavelength region, orange dyes having a maximum absorption peak in an about 300 nm to about 500 nm wavelength region, red dyes having a maximum absorption peak in an about 500 nm to about 650 nm wavelength region, and the like, and combinations thereof.

Examples of the metal complex may include without limitation direct dyes, acidic dyes, basic dyes, acidic mordant dyes, sulfur dyes, reduction dyes, azoic dyes, disperse dyes, reactivity dyes, oxidation dyes, alcohol soluble dyes, azo dyes, anthraquinone dyes, indigoid dyes, carbonium ion dyes, phthalocyanine dyes, nitro dyes, quinoline dyes, cyanine dyes, polymethine dyes, and the like, and combinations thereof.

The metal complex may include at least one metal ion. Examples of the metal ions include without limitation Mg, Ni, Cu, Co, Zn, Cr, Pt, Pd, Fe, and the like, and combinations thereof.

The metal complex dye may be a composite of at least one of solvent yellow 19, solvent yellow 21, solvent yellow 25, solvent yellow 79, solvent yellow 82, solvent yellow 88, solvent orange 45, solvent orange 54, solvent orange 62, solvent orange 99, solvent red 8, solvent red 32, solvent red 109, solvent red 112, solvent red 119, solvent red 124, solvent red 160, solvent red 132, and/or solvent red 218, and a metal ion.

The dye combination of the cyanine dye and the metal complex dye may provide a high contrast ratio as well as high luminance.

The cyanine dye and the metal complex dye may be mixed in a weight ratio of about 50:1 to about 1:50, for example about 30:1 to about 1:30, and as another example about 5:1 to about 1:5. Within the above weight ratio range, luminance and contrast ratio may be more improved.

Specifically, a color filter can have a transmittance of greater than or equal to about 95% in about 500 nm to about 800 nm wavelength region.

The cyanine dye and the metal complex dye may have solubility of greater than or equal to 5, for example about 5 to about 10 for a solvent used in the photosensitive resin composition for a color filter according to one embodiment, that is to say, the post-described solvent (F). The solubility refers to an amount of the dye that is dissolved in 100 g of the solvent. When the solubility of the cyanine dye and the metal complex dye is within the above range, compatibility with other components of a photosensitive resin composition for a color filter according to one embodiment and coloring properties may be ensured, and precipitation of a dye may be prevented.

Examples of the solvent may include, for example, propylene glycol monomethylether acetate (PGMEA), ethyl lactate (EL), ethylene glycol ethyl acetate (EGA), cyclohexanone, 3-methoxy-1-butanol, and the like, and combinations thereof.

The cyanine dye may have a high heat resistance. In other words, when measured with a thermogravimetric analyzer (TGA), the thermal decomposition temperature of the cyanine dye may be higher than or equal to about 200° C., for example about 200° C. to about 400° C.

The cyanine dye having the above characteristic may be used in a color filter, such as a color filter of a LCD and LED, that develops high luminance and high contrast ratio in desired color coordinates.

The photosensitive resin composition may include the dye combination of the cyanine dye and metal complex dye in an amount of about 1 to about 80 wt %, for example about 1 to about 20 wt %, based on the total amount (total weight) of the photosensitive resin composition. In some embodiments, the photosensitive resin composition can include the dye combination of the cyanine dye and metal complex dye in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the dye combination of the cyanine dye and metal complex dye can be in a range from about any of the foregoing amounts to about any other of the foregoing amounts.

When the dye combination of the cyanine dye and metal complex dye is used in an amount within the above range, high luminance and a contrast ratio may be shown in desired color coordinates.

(B') Pigment

The dye may be further mixed with a pigment and used, and in this case, the luminance and contrast ratio may be improved even more.

Examples of the pigment may include without limitation red, yellow, and/or orange pigments.

Examples of the red pigment may include without limitation C.I. pigment red 242, C.I. pigment red 214, C.I. pigment red 221, C.I. pigment red 166, C.I. pigment red 220, C.I. pigment red 248, C.I. pigment red 262, C.I. pigment red 254, C.I. pigment red 177, and the like of a color index, and they may be used singularly or as a mixture of two or more.

Examples of the yellow pigment may include without limitation C.I. yellow pigment 139, C.I. yellow pigment 138, C.I. yellow pigment 150, and the like, and combinations thereof to obtain the characteristics of a given color.

The pigment may be prepared as a dispersion solution and included in a photosensitive resin composition. Such a pigment dispersion may include the pigment and solvent, a dispersing agent, a binder resin, and the like.

Examples of the solvent used in the pigment dispersion may include without limitation ethylene glycol acetate, ethyl cellosolve, propylene glycol methyl ether acetate, ethyl lactate, polyethylene glycol, cyclohexanone, propylene glycol methyl ether, 3-methoxy-1-butanol, and the like, and combinations thereof. In exemplary embodiments, propylene glycol methyl ether acetate may be used.

The dispersing agent used in the pigment dispersion helps the pigment be uniformly dispersed, and may include a non-ionic, anionic, and/or cationic dispersing agent. Examples of the dispersing agent include without limitation polyalkylene glycols and/or esters thereof, polyoxy alkylenes, polyhydric alcohol ester alkylene oxide addition products, alcohol alkylene oxide addition products, sulfonate esters, sulfonate salts, carboxylate esters, carboxylate salts, alkyl amide alkylene oxide addition products, alkyl amines, and the like. They may be used singularly or as a mixture of two or more.

The binder resin used in the pigment dispersion may be an acrylic-based resin including a carboxyl group, and may improve the patterning properties of pixels as well as stability of a pigment dispersion solution.

The pigment can have a primary particle diameter ranging from about 10 nm to about 70 nm. When the pigment has a primary particle diameter within the above range, it can have excellent stability in a dispersion solution and may improve resolution of pixels.

The pigment has no particular limit in secondary particle diameter but may have a secondary particle diameter of less than or equal to about 200 nm, for example about 70 nm to about 100 nm considering resolution of pixels.

The dye and the pigment can be mixed in a weight ratio ranging from about 1:9 to about 9:1, for example, from about 3:7 to about 7:3. When mixed within the above range, the composition may not only maintain color characteristics but also have high luminance and contrast ratio.

(C) Acrylic-Based Binder Resin

The acrylic-based binder resin is a copolymer of a first ethylenic unsaturated monomer and a second ethylenic unsaturated monomer that is copolymerizable with the first ethylenic unsaturated monomer, and is a resin including at least one acrylic-based repeating unit.

The first ethylenic unsaturated monomer is an ethylenic unsaturated monomer including at least one carboxyl group. Examples of the monomer include without limitation acrylic acid, methacrylic acid, maleic acid, itaconic acid, fumaric acid, and the like, and combinations thereof.

The acrylic-based binder resin may include the first ethylenic unsaturated monomer in an amount ranging from about 5 to about 50 wt %, for example, from about 10 to about 40 wt %, based on the total amount (total weight) of the acrylic-based binder resin. In some embodiments, the acrylic-based binder resin may include the first ethylenic unsaturated monomer in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the first ethylenic unsaturated monomer can be in a range from about any of the foregoing amounts to about any other of the foregoing amounts.

Examples of the second ethylenic unsaturated monomer may include without limitation aromatic vinyl compounds such as styrene, α-methylstyrene, vinyltoluene, vinylbenzylmethylether, and the like; unsaturated carboxylic acid ester compounds such as methyl(meth)acrylate, ethyl(meth)acrylate, butyl(meth)acrylate, 2-hydroxyethyl(meth)acrylate, 2-hydroxy butyl(meth)acrylate, benzyl(meth)acrylate, cyclohexyl(meth)acrylate, phenyl(meth)acrylate, and the like; unsaturated carboxylic acid amino alkyl ester compounds such as 2-aminoethyl(meth)acrylate, 2-dimethylaminoethyl(meth)acrylate, and the like; carboxylic acid vinyl ester compounds such as vinyl acetate, vinyl benzoate, and the like; unsaturated carboxylic acid glycidyl ester compounds such as glycidyl(meth)acrylate and the like; vinyl cyanide compounds such as (meth)acrylonitrile and the like; unsaturated amide compounds such as (meth)acrylamide and the like; and the like. They may be used singularly or as a mixture of two or more.

Examples of the acrylic-based binder resin may include without limitation a methacrylic acid/benzylmethacrylate copolymer, a methacrylic acid/benzylmethacrylate/styrene copolymer, a methacrylic acid/benzylmethacrylate/2-hydroxyethylmethacrylate copolymer, a methacrylic acid/benzylmethacrylate/styrene/2-hydroxyethylmethacrylate copolymer, and the like. They may be used singularly or as a mixture of two or more.

The acrylic-based binder resin may have a weight average molecular weight ranging from about 3000 g/mol to about 150,000 g/mol, for example, from about 5000 g/mol to about 50,000 g/mol, and as another example, from about 20,000 g/mol to about 30,000 g/mol. When the acrylic-based binder resin has a weight average molecular weight within the above range, the composition may have an excellent close contacting (adhesive) property with a substrate, good physical and chemical properties, and appropriate viscosity.

The acrylic-based binder resin may have an acid value ranging from about 15 mgKOH/g to about 60 mgKOH/g, for example, from about 20 mgKOH/g to about 50 mgKOH/g. When the acrylic-based binder resin has an acid value within the above range, it may bring about excellent pixel resolution.

The photosensitive resin composition may include the acrylic-based binder resin in an amount ranging from about 0.1 to about 30 wt %, for example, from about 5 to about 20 wt %, based on the total amount (total weight) of the photosensitive resin composition for a color filter. In some embodiments, the photosensitive resin composition can include the acrylic-based binder resin in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or wt %. Further, according to some embodiments of the present invention, the amount of the acrylic-based binder resin can be in a range from about any of the foregoing amounts to about any other of the foregoing amounts.

When the acrylic-based binder resin is included in an amount within the above range, the composition may have an excellent developability and improved cross-linking, and thus can have excellent surface flatness when fabricated into a color filter.

(D) Photopolymerizable Monomer

The photopolymerization monomer may include a multi-functional monomer having two or more hydroxyl groups. Examples of the photopolymerizable monomer may include without limitation glycerol acrylate, dipentaerythritol hexaacrylate, ethylene glycol diacrylate, triethylene glycol diacrylate, 1,4-butanediol diacrylate, 1,6-hexanediol diacrylate, neopentyl glycol diacrylate, pentaerythritol diacrylate, pentaerythritol triacrylate, pentaerythritol diacrylate, dipentaerythritol triacrylate, dipentaerythritol acrylate, pentaerythritol hexaacrylate, bisphenol A diacrylate, trimethylolpropane triacrylate, novolac epoxyacrylate, ethylene glycol dimethacrylate, diethylene glycol dimethacrylate, triethylene glycol dimethacrylate, propylene glycol dimethacrylate, 1,4-butanediol dimethacrylate, 1,6-hexanediol dimethacrylate, and the like, and combinations thereof.

The photosensitive resin composition may include the photopolymerization monomer in an amount ranging from about 0.1 to about 30 wt %, for example, from about 5 to about 20 wt %, based on the total amount (total weight) of the photosensitive resin composition for a color filter. In some embodiments, the photosensitive resin composition can include the photopolymerization monomer in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the photopolymerization monomer can be in a range from about any of the foregoing amounts to about any other of the foregoing amounts.

When the photopolymerization monomer is included in an amount within the above range, the composition may have excellent pattern characteristics and developability.

(E) Photopolymerization Initiator

The photopolymerization initiator may be any generally-used photopolymerization initiator in a photosensitive resin composition for a color filter. Examples of the photopolymerization initiator may include without limitation acetophenone-based compounds, benzophenone-based compounds, thioxanthone-based compounds, benzoin-based compounds, triazine-based compounds, oxime-based compounds, and the like, and combinations thereof.

Examples of the acetophenone-based compound may include without limitation 2,2'-diethoxyacetophenone, 2,2'-dibutoxyacetophenone, 2-hydroxy-2-methylpropinophenone, p-t-butyltrichloroacetophenone, p-t-butyldichloroacetophenone, 4-chloroacetophenone, 2,2'-dichloro-4-phenoxyacetophenone, 2-methyl-1-(4-(methylthio)phenyl)-2-morpholinopropan-1-one, 2-benzyl-2-dimethylamino-1-(4-morpholinophenyl)-butan-1-one, and the like and combinations thereof.

Examples of the benzophenone-based compound may include without limitation benzophenone, benzoyl benzoic acid, benzoyl benzoic acid methyl, 4-phenyl benzophenone, hydroxy benzophenone, acrylated benzophenone, 4,4'-bis(dimethyl amino)benzophenone, 4,4'-bis(diethylamino)benzophenone, 4,4'-dimethylaminobenzophenone, 4,4'-dichlorobenzophenone, 3,3'-dimethyl-2-methoxybenzophenone, and the like and combinations thereof.

Examples of the thioxanthone-based compound may include without limitation thioxanthone, 2-methylthioxanthone, isopropyl thioxanthone, 2,4-diethyl thioxanthone, 2,4-diisopropyl thioxanthone, 2-chlorothioxanthone, and the like and combinations thereof.

Examples of the benzoin-based compound may include without limitation benzoin, benzoin methyl ether, benzoin ethyl ether, benzoin isopropyl ether, benzoin isobutyl ether, benzyldimethylketal, and the like and combinations thereof.

Examples of the triazine-based compound may include without limitation 2,4,6-trichloro-s-triazine, 2-phenyl 4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloro methyl)-s-triazine, 2-biphenyl 4,6-bis(trichloro methyl)-s-triazine, bis(trichloromethyl)-6-styryl-s-triazine, 2-(naphtho1-yl)-4,6-bis(trichloromethyl)-s-triazine, 2-(4-methoxynaphtho1-yl)-4,6-bis(trichloromethyl)-s-triazine, 2-4-tri chloromethyl(piperonyl)-6-triazine, 2-4-trichloromethyl (4'-methoxystyryl)-6-triazine, and the like and combinations thereof.

Examples of the oxime-based compound may include without limitation 2-(o-benzoyloxime)-1-[4-(phenylthio) phenyl]-1,2-octandione, 1-(o-acetyloxime)-1-[9-ethyl-6-(2-methylbenzoyl)-9H-carbazol-3-yl]ethanone, and the like and combinations thereof.

Other examples of the photopolymerization initiator may include without limitation carbazole-based compounds, diketone-based compounds, sulfonium borate-based compounds, diazo-based compounds, biimidazole-based compounds, and the like, and combinations thereof.

The photosensitive resin composition may include the photopolymerization initiator in an amount ranging from about 0.1 to about 5 wt %, for example, from about 1 to about 3 wt %, based on the total amount (total weight) of the photosensitive resin composition for a color filter. In some embodiments, the photosensitive resin composition can include the photopolymerization initiator in an amount of about 0.1, 0.2, 0.3, 0.4, 0.5, 0.6, 0.7, 0.8, 0.9, 1, 2, 3, 4, or 5 wt %. Further, according to some embodiments of the present invention, the amount of the photopolymerization initiator can be in a range from about any of the foregoing amounts to about any other of the foregoing amounts.

When the photopolymerization initiator is included in an amount within the above range, the composition may be sufficiently photopolymerized when exposed to light during the pattern-forming process for preparing a color filter, which can provide excellent sensitivity and improve transmittance.

(F) Solvent

The solvent is not specifically limited. Examples of the solvent include without limitation alcohols such as methanol, ethanol, and the like; ethers such as dichloroethyl ether, n-butyl ether, diisoamyl ether, methylphenyl ether, tetrahydrofuran, and the like; glycol ethers such as ethylene glycol methylether, ethylene glycol ethylether, propylene glycol methylether, and the like; cellosolve acetates such as methyl cellosolve acetate, ethyl cellosolve acetate, diethyl cellosolve acetate, and the like; carbitols such as methylethyl carbitol, diethyl carbitol, diethylene glycol monomethylether, diethylene glycol monoethylether, diethylene glycol dimethylether, diethylene glycol methylethylether, diethylene glycol diethylether, and the like; propylene glycol alkylether acetates such as propylene glycol methylether acetate, propylene glycol propylether acetate, and the like; aromatic hydrocarbons such as toluene, xylene, and the like; ketones such as methylethylketone, cyclohexanone, 4-hydroxy-4-methyl-2-pentanone, methyl-n-propylketone, methyl-n-butylketone, methyl-n-amylketone, 2-heptanone, and the like; saturated aliphatic monocarboxylic acid alkyl esters such as ethyl acetate, n-butyl acetate, isobutyl acetate, and the like; lactic acid alkyl esters such as methyl lactate, ethyl lactate, and the like; hydroxyacetic acid alkyl esters such as methyl hydroxyacetate, ethyl hydroxyacetate, butyl hydroxyacetate, and the like; acetic acid alkoxyalkyl esters such as methoxymethyl acetate, methoxyethyl acetate, methoxybutyl acetate, ethoxymethyl acetate, ethoxyethyl acetate, and the like; 3-hydroxypropionic acid alkyl esters such as methyl 3-hydroxypropionate, ethyl 3-hydroxypropionate, and the like; 3-alkoxypropionic acid alkyl esters such as methyl 3-methoxypropionate, ethyl 3-methoxypropionate, ethyl 3-ethoxypropionate, methyl 3-ethoxypropionate, and the like; 2-hydroxypropionic acid alkyl esters such as methyl 2-hydroxypropionate, ethyl 2-hydroxypropionate, propyl 2-hydroxypropionate, and the like; 2-alkoxypropionic acid alkyl esters such as methyl 2-methoxypropionate, ethyl 2-methoxypropionate, ethyl 2-ethoxypropionate, methyl 2-ethoxypropionate, and the like; 2-hydroxy-2-methylpropionic acid alkyl esters such as methyl 2-hydroxy-2-methylpropionate, ethyl 2-hydroxy-2- methylpropionate, and the like; 2-alkoxy-2-methylpropionic acid alkyl esters such as methyl 2-methoxy-2-methylpropionate, ethyl 2-ethoxy-2-methylpropionate, and the like; esters such as 2-hydroxyethyl propionate, 2-hydroxy-2-methylethyl propionate, hydroxyethyl acetate, methyl 2-hydroxy-3-methylbutanoate, and the like; ketonic acid ester compounds such as ethyl pyruvate, and the like and combinations thereof. Further examples of the solvent may include without limitation N-methylformamide, N,N-dimethylformamide, N-methylformanilide, N-methylacetamide, N,N-dimethylacetamide, N-methylpyrrolidone, dimethylsulfoxide, benzylethylether, dihexylether, acetylacetone, isophorone, caproic acid, caprylic acid, 1-octanol, 1-nonanol, benzylalcohol, benzyl acetate, ethyl benzoate, diethyl oxalate, diethyl maleate, γ-butyrolactone, ethylene carbonate, propylene carbonate, phenyl cellosolve acetate, and the like. These may be used singularly or as a mixture of two or more.

The solvent, considering miscibility, reactivity, and the like, may include glycol ethers such as ethylene glycol monoethyl ether, and the like; ethylene glycol alkylether acetates such as ethyl cellosolve acetate, and the like; esters such as 2-hydroxyethyl propionate, and the like; diethylene glycols such as diethylene glycol monomethyl ether, and the like; propylene glycol alkylether acetates such as propylene glycol monomethylether acetate, propylene glycol propylether acetate, and the like, and combinations thereof.

The photosensitive resin composition may include the solvent in a balance amount, for example, in an amount ranging from about 20 to about 90 wt %, based on the total amount (total weight) of the photosensitive resin composition. In some embodiments, the photosensitive resin composition can include the solvent in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the solvent can be in a range from about any of the foregoing amounts to about any other of the foregoing amounts.

When the solvent is included in an amount within the above range, the photosensitive resin composition may have excellent coating properties and may maintain excellent flatness in a layer having a thickness of greater than or equal to about 3 μm.

(G) Surfactant

The photosensitive resin composition for a color filter may further include a surfactant to uniformly disperse the pigment into the solvent and to improve leveling performance.

The surfactant may include a fluorine-based surfactant and/or a silicon-based surfactant.

Examples of the fluorine-based surfactant may include without limitation F-482, F-484, F-478, and the like, and combinations thereof, made by DIC Co., Ltd.

Examples of the silicon-based surfactant may include without limitation TSF400, TSF401, TSF410, TSF4440, and the like, and combinations thereof, made by Toshiba Silicon Co., Ltd.

The photosensitive resin composition may include the surfactant in an amount ranging from about 0.01 to about 5 parts by weight, for example, from about 0.1 to about 2 parts by weight, based on about 100 parts by weight of the photosensitive resin composition. When the surfactant is included in an amount within the above range, the composition may have fewer impurities generated after the development.

(H) Other Additive(s)

The photosensitive resin composition for a color filter may further include one or more other additives such as but not limited to malonic acid, 3-amino-1,2-propanediol, a vinyl- and/or (meth)acryloxy-containing silane-based coupling agent, and the like, and combinations thereof, in order to prevent stains or spots during coating, to adjust leveling, and/or to prevent pattern residue due to non-development. The amount of the additives may be readily adjusted depending on desired properties.

In addition, the photosensitive resin composition for a color filter may include an epoxy compound to improve the close contacting (adhesive) property and other characteristics if needed.

Examples of the epoxy compound may include without limitation epoxy novolac acryl carboxylate resins, ortho cresol novolac epoxy resins, phenol novolac epoxy resins, tetra methyl biphenyl epoxy resins, bisphenol A-type epoxy resins, alicyclic epoxy resins, and the like, and combinations thereof.

When the epoxy compound is included, a peroxide initiator or a radical polymerization initiator such as an azobis-based initiator can be additionally included.

The photosensitive resin composition can include the epoxy compound in an amount of about 0.01 to about 5 parts by weight based on about 100 parts by weight of the photosensitive resin composition for a color filter. When the epoxy compound is included in an amount within the above range, storage properties, close contacting forces, and the like may be improved.

Methods of making the photosensitive resin composition for a color filter are not particularly limited. The photosensitive resin composition can be prepared by mixing the yellow or orange dye, dye combination, acrylic-based binder resin, photopolymerization initiator, photopolymerization monomer, and solvent, and optionally the additive(s).

According to another embodiment of the present invention, provided is a color filter manufactured using the photosensitive resin composition.

This color filter may be manufactured in a general method, for example, by spin-coating, roller-coating, slit-coating, and the like the photosensitive resin composition onto a substrate to have a thickness ranging from about 1.5 μm to about 2.0 μm. After coating, the layer can be radiated with a UV ray, an electron beam, or an X-ray to form a pattern required for a color filter. The UV ray may have a wavelength region ranging from about 190 nm to about 450 nm, for example, from about 200 nm to about 400 nm. Subsequently, when the coated layer is treated with an alkali developing solution, the non-radiated region thereof may be dissolved, forming a pattern for an image color filter. This process can be repeated depending on the necessary number of R, G, and B colors, fabricating a color filter having a desired pattern. In addition, the image pattern acquired by the development can be cured through heat treatment, actinic ray radiation, or the like, to improve crack resistance, solvent resistance, and the like.

Hereinafter, the present invention is described in more detail with reference to the following examples. These examples, however, are not in any sense to be interpreted as limiting the scope of the invention.

(Preparation of Photosensitive Resin Composition for Color Filter)

Photosensitive resin compositions are prepared using the following components.

(A) Yellow or Orange Dye
(A-1) Yellow Dye
Yellow 6G (Lanxess Corporate) is used.
(A-2) Orange Dye
KCF 0009 (Kyung-In Synthetic Corporation) is used.
(B-1) Cyanine Dye
KCF R038 (Kyung-In Synthetic Corporation) is used.
(B-2) Metal Complex Dye
KCF R037 (Kyung-In Synthetic Corporation) is used.
(C) Acrylic-Based Binder Resin
A methacrylic acid/benzylmethacrylate copolymer (mixed weight ratio 30/70) having a weight average molecular weight of 28,000 g/mol is used.
(D) Photopolymerizable Monomer
Dipentaerythritolhexaacrylate is used.
(E) Photopolymerization Initiator
CGI-124 of Ciba Specialty Chemicals Co. is used.
(F) Solvent
A mixture of propylene glycol monomethyl ether acetate and ethyl 3-ethoxypropionate is used.
(G) Surfactant
A fluorine-based surfactant (F-482, DIC Co., Ltd.) is used.

EXAMPLE 1

2 g of the photopolymerization initiator (D) is dissolved in 44.5 g of propylene glycol monomethyl ether acetate and 15 g of ethyl 3-ethoxypropionate as the solvent (F) and then agitated at room temperature for 2 hours. Subsequently, 0.2 g of the yellow dye (A-1), 2.7 g of the cyanine dye (B-1), and 0.1 g of the metal complex (B-2) are added and agitated for 30 minutes, and then 15 g of the acrylic-based binder resin (C) and 20 g of a photopolymerizable monomer (E) are added and agitated at room temperature for 2 hours. Subsequently, 0.5 g of a surfactant (G) is added and agitated at room temperature for 1 hour. The solution is filtered three times to remove impurity so as to prepare a photosensitive resin composition.

EXAMPLE 2

A photosensitive resin composition is prepared according to the same method as Example 1, except that 0.4 g of the yellow dye (A-1) is used instead of 0.2 g and 2.5 g of the cyanine dye (B-1) is used instead of 2.7 g.

EXAMPLE 3

A photosensitive resin composition is prepared according to the same method as Example 1, except that 0.4 g of the orange dye (A-2) is used instead of the yellow dye (A-1) and the cyanine dye (B-1) is used.

COMPARATIVE EXAMPLE 1

A photosensitive resin composition is prepared according to the same method as Example 1, except that 2.9 g of the cyanine dye (B-1) is used instead of 2.7 g and the yellow or orange dye (A) is not used.

COMPARATIVE EXAMPLE 2

A photosensitive resin composition is prepared according to the same method as Example 1, except that 0.2 g of yellow pigment Y138 is additionally used and the yellow or orange dye (A) is not used.

(Properties Evaluation 1: Luminance Measurement)

In order to measure luminance, photosensitive resin compositions for a color filter according to Examples 1 to 3 and Comparative Examples 1 and 2, respectively, are coated to be 1 μm to 2 μm thick on a 1 mm-thick degreased glass substrate and dried on a hot plate at 90° C. for 3 minutes, obtaining each thin film. The obtained films are cooled, exposed to a radiation dose of 100 mJ/cm$^2$ (365 nm reference) and dried at 230° C. in a forced convection drying furnace for 30 minutes. Luminance is measured using a spectrophotometer (Otsuka Electronics Co., Ltd., MCPD3000), and the results are shown in the following Table 1.

Color coordinate (x and y) and luminance (Y) are measured using a colorimeter (Otsuka Electronics Co., Ltd., MCPD 3000), and converted with reference to a LED light source.

(Properties Evaluation 2: Measurement of Contrast Ratio)

In order to measure a contrast ratio, the photosensitive resin compositions for a color filter according to the Examples 1 to 3 and Comparative Examples 1 to 2, respectively, are spin-coated to be 2 μm thick on 1 mm-thick onto 10 cm×10 cm width degreased glass substrates (bare glasses) using a spin coater, K-Spin8 of KDNS Co., Ltd., soft-baked on a 90° C. hot plate for 90 seconds, and cooled to room temperature for 1 minute. Each light amount is measured when a polarizer is open and closed by using contrast tester CT-1 made by Tsubosaka Electric Co., Ltd., and a contrast ratio is calculated according to the following Equation 1. The measurement results of the contrast ratios are shown in the following Table 1.

○: contrast ratio of greater than or equal to 15000
: contrast ratio of greater than or equal to 5000 and less than 10000
X: contrast ratio of less than 10000

$$\text{Contrast ratio} = L_{open}/L_{close} \quad \text{[Equation 1]}$$

$L_{open}$: light amount when a polarizing plate is open
$L_{close}$: light amount when a polarizing plate is closed

TABLE 1

| | Color coordinate | | Luminance | |
| --- | --- | --- | --- | --- |
| | x | y | Y | Contrast ratio |
| Example 1 | 0.646 | 0.323 | 16.65 | ○ |
| Example 2 | 0.646 | 0.326 | 17.65 | ○ |
| Example 3 | 0.646 | 0.322 | 16.61 | ○ |
| Comparative Example 1 | 0.646 | 0.321 | 16.05 | |
| Comparative Example 2 | 0.646 | 0.322 | 15.90 | X |

From the Table 1, Examples 1 to 3 using the yellow or orange dye according to one embodiment exhibit high luminance and contrast ratio simultaneously. From the results of Examples 1 to 3, as the amounts of the yellow and orange dye increase and the amount of the cyanine dye decreases, the color coordinate y increases and luminance and the contrast ratio becomes higher.

On the other hand, Comparative Example 1 using only cyanine dye and metal complex has a different color coordinate from a conventional color target and exhibits low luminance.

Comparative Example 2 using the yellow pigment exhibits low luminance and contrast ratio.

Form the results, the photosensitive resin composition for a color filter including the yellow or orange dye as well as the cyanine dye and metal complex dye according to one embodiment exhibits improved luminance while maintaining an appropriate contrast ratio, compared with the photosensitive resin composition for a color filter including only dye combination of the cyanine dye and metal complex dye without the yellow or orange dye.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A photosensitive resin composition for a color filter, comprising:
   (A) about 0.1 wt % to about 5 wt % of a yellow or orange dye;
   (B) about 1 wt % to about 40 wt % of a dye combination of a cyanine dye represented by the following Chemical Formula 1 and a metal complex dye;
   (C) about 0.1 wt % to about 30 wt % of an acrylic-based binder resin;
   (D) about 0.1 wt % to about 30 wt % of a photopolymerizable monomer;
   (E) about 0.1 wt % to about 5 wt % of a photopolymerization initiator; and
   (F) a balance amount of a solvent:

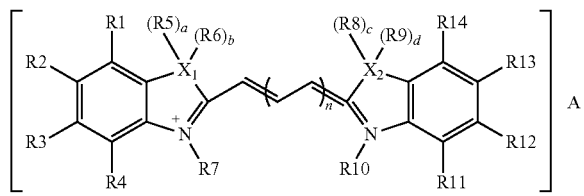

[Chemical Formula 1]

wherein, in the above Chemical Formula 1, $X_1$ and $X_2$ are the same or different and are each independently carbon, nitrogen, oxygen or sulfur, R1 to R4 and R11 to R14 are the same or different and are each independently hydrogen, halogen, substituted or unsubstituted C1 to C20 alkyl, substituted or unsubstituted C1 to C20 haloalkyl, substituted or unsubstituted C1 to C20 alkoxy, substituted or unsubstituted C2 to C20 alkenyl, substituted or unsubstituted C2 to C20 alkynyl, substituted or unsubstituted C3 to C20 cycloalkyl, substituted or unsubstituted C3 to C20 cycloalkenyl, substituted or unsubstituted C3 to C20 cycloalkynyl, substituted or unsubstituted C2 to C20 heterocycloalkyl, substituted or unsubstituted C2 to C20 heterocycloalkenyl, substituted or unsubstituted C2 to C20 heterocycloalkynyl, substituted or unsubstituted C6 to C30 aryl, substituted or unsubstituted C2 to C30 heteroaryl, or substituted or unsubstituted C1 to C20 alkyl(meth)acrylate, R5, R6, R8 and R9 are the same or different and are each independently hydrogen or substituted or unsubstituted C1 to C20 alkyl, R7 and R10 are the same or different and are each independently hydrogen, substituted or unsubstituted C1 to C20 alkyl, substituted or unsubstituted C1 to C20 alkyl(meth)acrylate, or substituted or unsubstituted C6 to C30 aryl, n is an integer ranging from 1 to 4, a, b, c and d are the same or different and are each independently 0 or 1, A is a halogen ion, $ClO_4^-$, $BF_4^-$, $SbF_6^-$, $CF_3SO_3^-$, $N(SO_2CF_3)_2^-$ or one of compounds represented by the following Chemical Formulae 2-1 and 2-2:

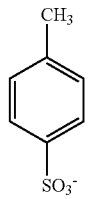

[Chemical Formula 2-1]

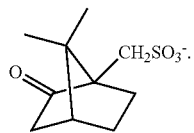

[Chemical Formula 2-2]

2. The photosensitive resin composition for a color filter of claim 1, wherein the yellow or orange dye has a transmittance of about 0% to about 40% in an about 380 nm to about 500 nm wavelength region, and a transmittance of about 50% to about 100% in an about 570 nm to about 590 nm wavelength region.

3. The photosensitive resin composition for a color filter of claim 1, wherein the yellow or orange dye includes a direct dye, acidic dye, basic dye, acidic mordant dye, sulfur dye, reduction dye, azoic dye, disperse dye, reactivity dye, oxidation dye, alcohol soluble dye, azo dye, anthraquinone dye, indigoid dye, carbonium ion dye, phthalocyanine dye, nitro dye, quinoline dye, cyanine dye, methine dye, or a combination thereof.

4. The photosensitive resin composition for a color filter of claim 1, wherein the yellow or orange dye includes solvent yellow 19, solvent yellow 21, solvent yellow 25, solvent yellow 79, solvent yellow 82, solvent yellow 88, solvent orange 45, solvent orange 54, solvent orange 62, solvent orange 99, or a combination thereof.

5. The photosensitive resin composition for a color filter of claim 1, wherein the yellow or orange dye has a transmittance of about 0% to about 1% in an about 380 nm to about 450 nm wavelength region, and a transmittance of about 1% to about 100% in an about 450 nm to about 550 nm wavelength region.

6. The photosensitive resin composition for a color filter of claim 1, wherein R5, R6, R8, and R9 in the above Chemical Formula 1 are hydrogen or substituted or unsubstituted C1 to C20 alkyl.

7. The photosensitive resin composition for a color filter of claim 1, wherein R7 and R10 in the above Chemical Formula 1 are independently hydrogen, substituted or unsubstituted C1 to C20 alkyl, substituted or unsubstituted C1 to C20 alkyl(meth)acrylate, or substituted or unsubstituted C6 to C30 aryl.

8. The photosensitive resin composition for a color filter of claim 1, wherein, in the above Chemical Formula 1, A is $CF_3SO_3^-$ or $N(SO_2CF_3)_2^-$.

9. The photosensitive resin composition for a color filter of claim 1, wherein the cyanine dye represented by the above Chemical Formula 1 re-emits light in a wavelength of about 400 nm to about 700 nm.

10. The photosensitive resin composition for a color filter of claim 1, wherein the cyanine dye is a red dye.

11. The photosensitive resin composition for a color filter of claim 1, wherein the metal complex dye has a maximum absorption peak in the wavelength of about 200 nm to about 650 nm.

12. The photosensitive resin composition for a color filter of claim 1, wherein the metal complex dye comprises a metal ion comprising Mg, Ni, Cu, Co, Zn, Cr, Pt, Pd, Fe, or a combination thereof.

13. The photosensitive resin composition for a color filter of claim 1, wherein the metal complex dye comprises a composite of a metal ion and solvent yellow 19, solvent yellow 21, solvent yellow 25, solvent yellow 79, solvent yellow 82, solvent yellow 88, solvent orange 45, solvent orange 54, solvent orange 62, solvent orange 99, solvent red 8, solvent red 32, solvent red 109, solvent red 112, solvent red 119, solvent red 124, solvent red 160, solvent red 132, solvent red 218, or a combination thereof.

14. The photosensitive resin composition for a color filter of claim 1, wherein the photosensitive resin composition for a color filter further comprises a pigment.

15. The photosensitive resin composition for a color filter of claim 14, wherein the pigment comprises C.I. pigment red 242, C.I. pigment red 214, C.I. pigment red 221, C.I. pigment red 166, C.I. pigment red 220, C.I. pigment red 248, C.I. pigment red 262, C.I. pigment red 254, C.I. pigment red 177, C.I. yellow pigment 150, or a combination thereof.

16. The photosensitive resin composition for a color filter of claim 14, wherein the photosensitive resin composition for a color filter comprises the cyanine dye and the pigment at a weight ratio of about 1:9 to about 9:1.

17. A color filter manufactured using the photosensitive resin composition for a color filter according to claim 1.

18. The color filter of claim 17, wherein the color filter is applied to a LED light source.

19. The photosensitive resin composition for a color filter of claim 1, comprising (B) about 1 wt % to about 20 wt % of the dye combination of the cyanine dye represented by Chemical Formula 1 and the metal complex dye.

* * * * *